No. 661,187. Patented Nov. 6, 1900.
W. A. MORRIS.
PIPE WRENCH.
(Application filed Mar. 6, 1900.)
(No Model.)
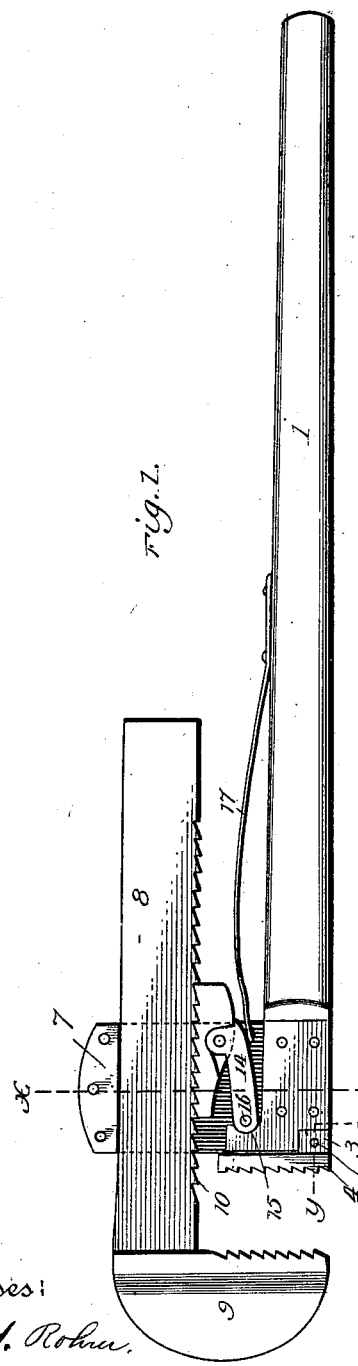

UNITED STATES PATENT OFFICE.

WILLARD A. MORRIS, OF CEDAR BLUFFS, NEBRASKA.

PIPE-WRENCH.

SPECIFICATION forming part of Letters Patent No. 661,187, dated November 6, 1900.

Application filed March 6, 1900. Serial No. 7,551. (No model.)

*To all whom it may concern:*

Be it known that I, WILLARD A. MORRIS, a citizen of the United States, residing at Cedar Bluffs, in the county of Saunders and State of Nebraska, have invented certain new and useful Improvements in Pipe-Wrenches, of which the following is a specification.

This invention relates to new and useful improvements in wrenches; and its primary object is to provide a device of this character which may be readily adjusted to pipes, nuts, &c., of various sizes and held securely in such position.

To these ends the invention consists in the novel constructions and combinations of parts hereinafter more fully described and claimed, and illustrated in the accompanying drawings, showing the preferred form of my invention, and in which—

Figure 1 is a side elevation thereof with one of the side plates removed. Fig. 2 is a section on line $x\ x$, Fig. 1. Fig. 3 is a detail view of the toothed block. Fig. 4 is a detail view of the link; and Fig. 5 is a section on line $y\ y$, Fig. 1.

Referring to said figures by numerals of reference, 1 is the handle of the wrench, recessed at its enlarged or forward end at 2 for the reception of a stud or projection 3, formed on the inner surface of a jaw-plate 4, having a suitable working face. This stud is secured within the recess 2 by means of a rivet 5 or other suitable device.

To the sides of the enlarged end of the handle 1 are secured plates 6, preferably riveted at their opposite ends to a block 7, fitted therebetween and forming a yoke, as shown. If desired, however, said plates and block can be formed in one piece.

Slidably mounted between the plates 6, the block 7, and the handle 1 is a shank 8 of the sliding jaw 9. This shank is provided at its lower edge with transversely-extending teeth 10, adapted to be engaged by teeth formed upon a movable block 11, recessed within its under surface, as shown at 12, Fig. 3, for the reception of the forked end 13 of a link 14, pivotally secured thereto by means of a rivet or in other suitable manner. The opposite end of said link pivots within a recess 15, formed upon the upper edge of the enlarged end of the handle 1, and is held therein by means of pins 16, projecting into the side plates 6. A spring 17 is secured to the upper edge of the handle 1, and the end thereof bears upon the link 14, thereby holding the toothed block 11 normally in engagement with the teeth upon the shank 8.

In operation when it is desired to slide the jaws together it is merely necessary to grasp the shank 8 and force the handle 1 forward. This will cause the block 11 to slip over the teeth 10 of the shank 8, the spring 17 reseating the block within said teeth, and thereby preventing the jaws from moving apart. When it is desired to open the jaws, the shank 8 should be grasped by one hand and the spring 17 depressed. This will release the block 11 from engagement with the teeth of the shank, and the same may then be adjusted at will.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. A wrench comprising a handle having a recessed stationary jaw, a plate, a stud thereto secured within the recess, a yoke, a jaw having a toothed shank slidably mounted within the yoke, a toothed block within the yoke, a link pivoted to said block and to the handle, and a spring secured to the handle and bearing upon the link, whereby the toothed block is held normally in engagement with the toothed shank.

2. A wrench comprising a handle having a recessed stationary jaw, a plate, a stud thereto secured within the recess, a yoke, a jaw having a toothed shank slidably mounted within the yoke, a recessed toothed block within the yoke, a link pivoted within said recess and to the handle, and a spring secured to said handle, and bearing upon said link, whereby the toothed block is held normally in engagement with the toothed shank.

In testimony whereof I affix my signature in presence of two witnesses.

WILLARD A. MORRIS.

Witnesses:
HENRY WELMER,
E. H. RIDSDALE.